United States Patent Office 2,920,726
Patented Jan. 12, 1960

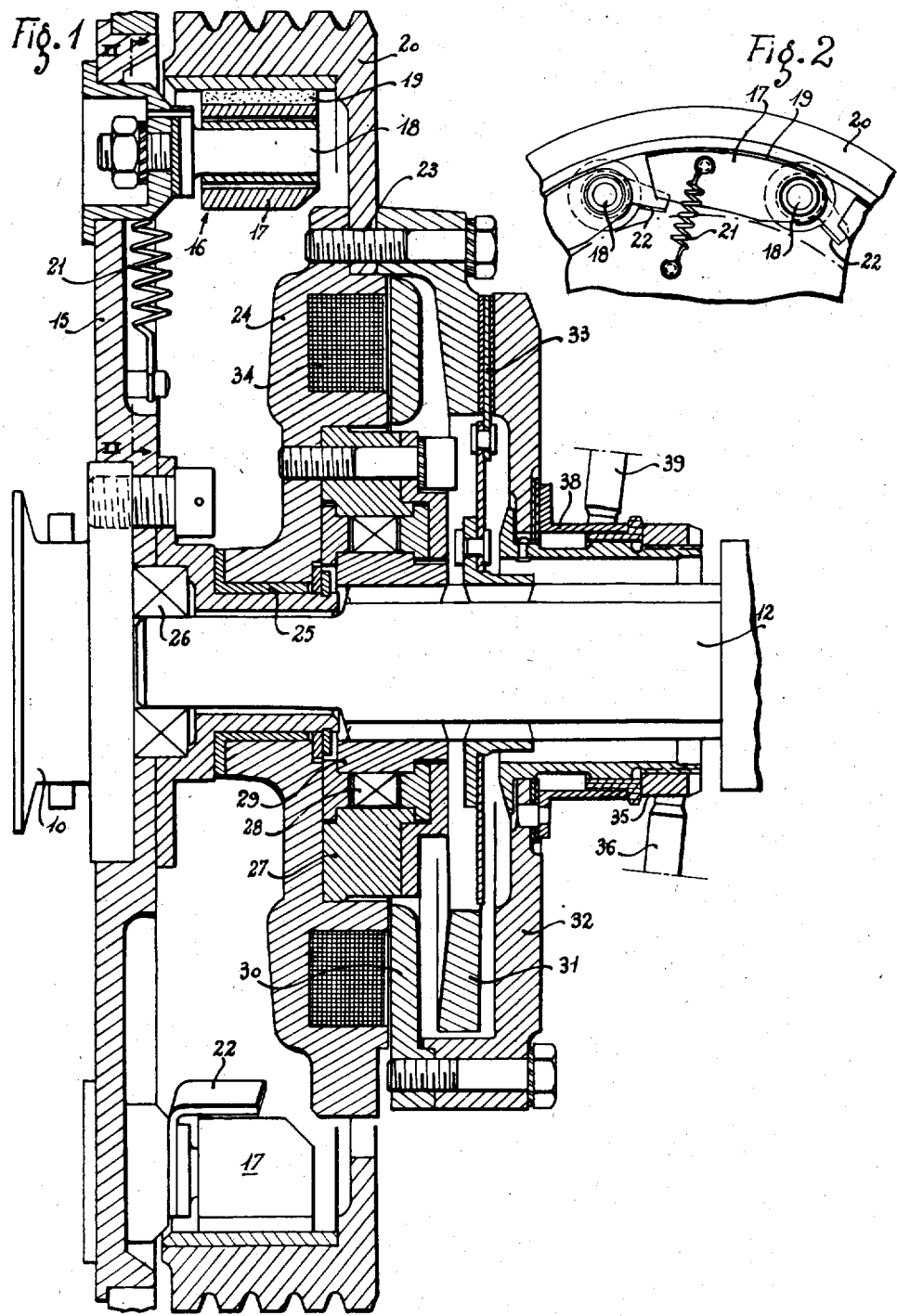

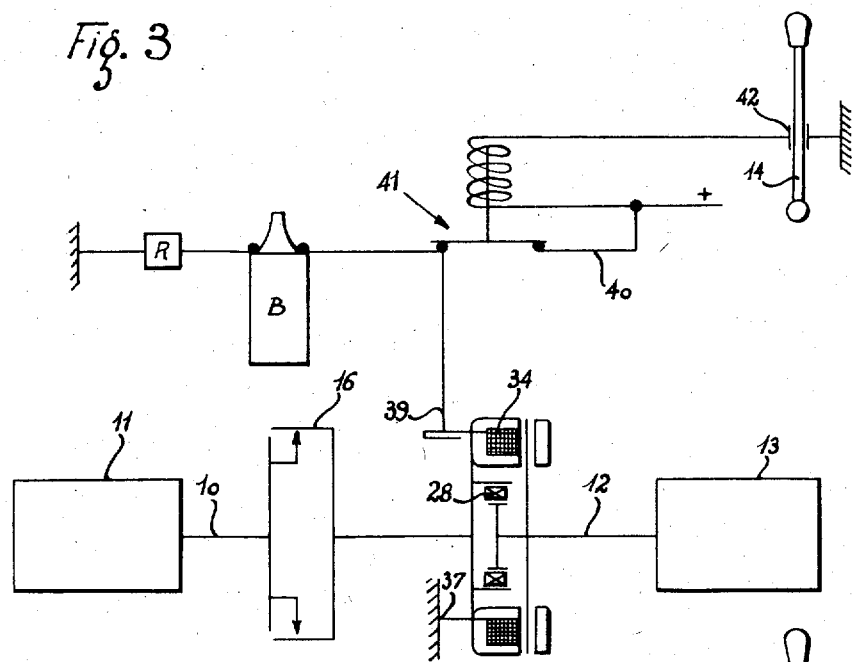
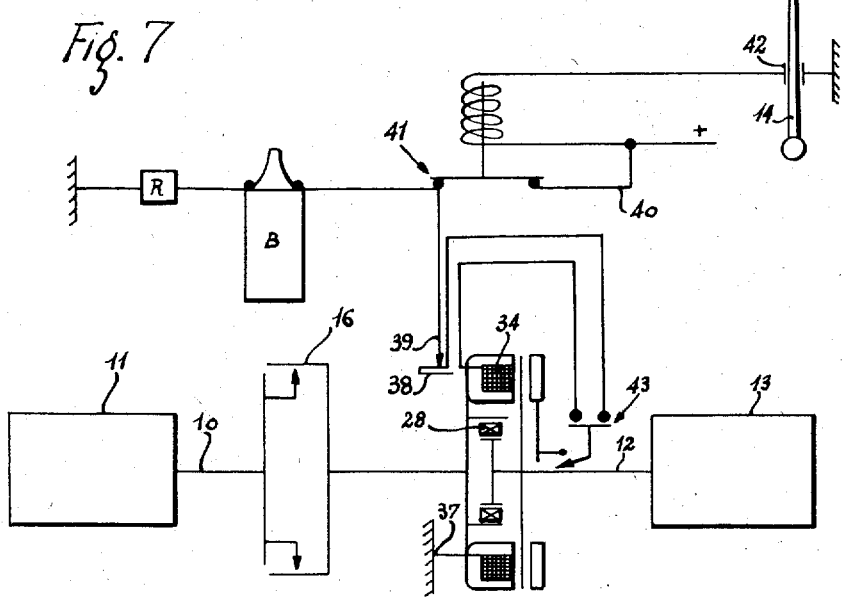

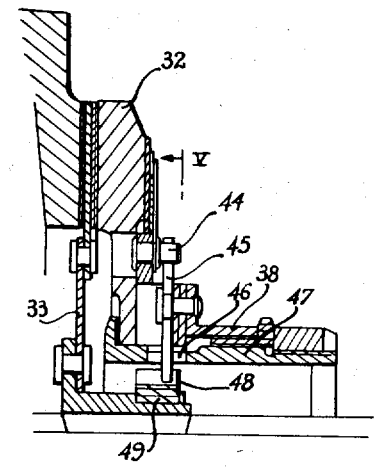
Fig. 4
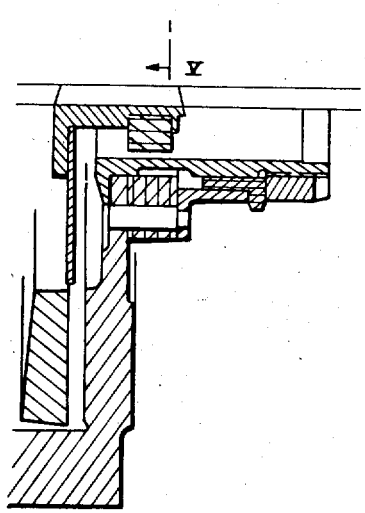
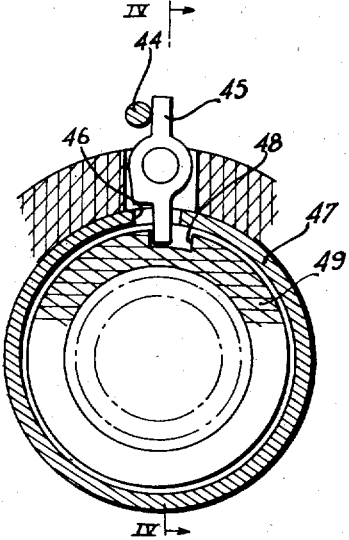
Fig. 5
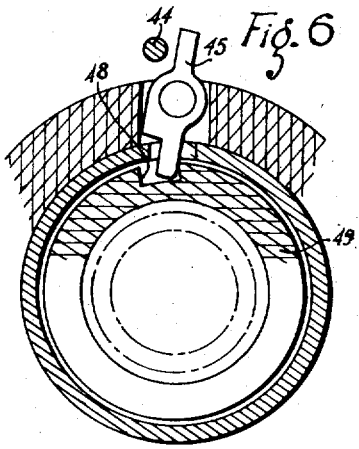
Fig. 6

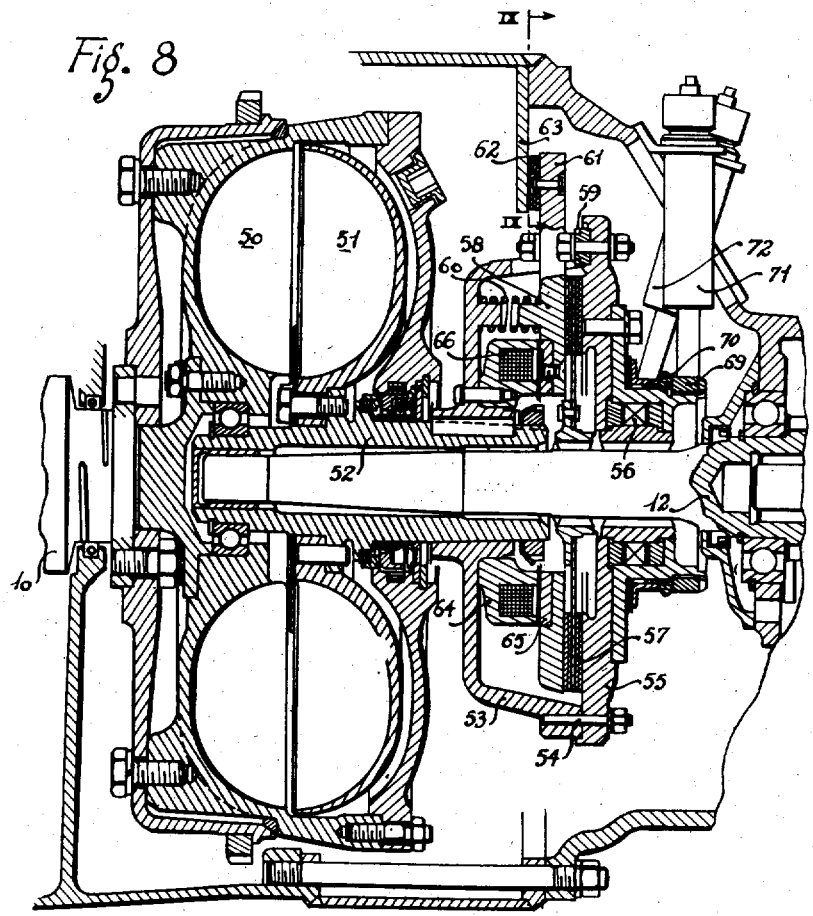
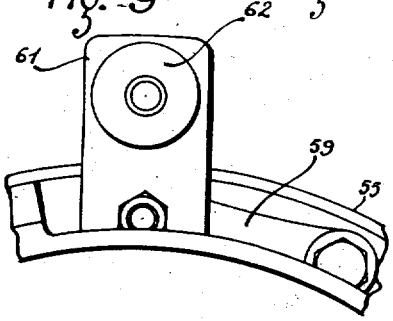
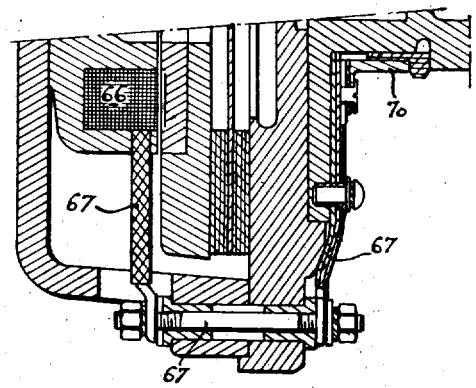

2,920,726

AUTOMATIC CLUTCHES

Jean Maurice, Ablon, and Michel Rist, Paris, France, assignors to Societe Anonyme Francaise du Ferodo, Paris, France, a corporation of France Application September 28, 1955, Serial No. 537,175

Claims priority, application France September 28, 1954

10 Claims. (Cl. 192—.09)

The present invention has for its object an automatic clutch, that is to say one without a clutch pedal, which is especially characterised in that between the driving shaft and the driven shaft are arranged in series, on the one hand a main coupling the transmissible torque of which varies as a rising function of the speed of the driving shaft, and on the other hand, an auxiliary coupling comprising in parallel a free-wheel locked in the forward direction, and a torque-limiting device, the characteristics of which are pre-determined and which is controlled by the gear lever in such manner as to be free or engaged, depending on whether the said lever is actuated or not. This arrangement has the result of ensuring progressive starting and acceleration whilst at the same time it is of simple construction and gear-changing is easy, the use of the engine as a brake being permitted at any opportune moment.

The main coupling is preferably chosen as a centrifugal type. It may be mechanical and be provided with weight-heads or it may be hydraulic, such as a coupling device or torque-converter, this coupling being disengaged when the engine is idling.

In accordance with a further feature, the pre-determined torque transmissible by the torque-limiter of the auxiliary coupling is given a value slightly greater than the torque developed by the compression of the engine. A torque limitation of this kind, whilst enabling the engine to be used as a brake, also enables the dimensioning and the strength of the torque-limiter of the auxiliary coupling to be reduced on the one hand, and on the other hand, it prevents shocks being transmitted to the transmission and skidding of the driving wheels.

In one preferred form of embodiment, the torque-limiter of the auxiliary coupling is provided with an electro-magnet which is connected in a circuit comprising a switch controlled by the gear-lever. This electro-magnet may be arranged so as to cause itself the application of pressure to the friction linings of the limiter device, or alternatively to annul such pressure when it is applied mechanically. In the first case, means are preferably provided to render the electro-magnet active only when the driven shaft tends to rotate the driving shaft, whilst the gear-lever is not actuated. This enables the consumption of electric current to be substantially reduced.

In all cases, the control of the auxiliary coupling by the gear-lever permits of easy changing of gears. In fact, at the moment of changing gears, the user instinctively releases the accelerator. The driving shaft then rotates less quickly than the driven shaft; the free-wheel is thus released and the break is complete in the transmission system at the point of the free-wheel as for the torque-limiter of the auxiliary coupling.

With a view to freeing the user from the necessity of releasing, even instinctively, the accelerator at the moment of changing gear, there is provided in accordance with the invention, a special control of the butterfly valve of the accelerator. This control comprises, in addition to the pedal operated by the user, a means controlled by the gear-lever and having a preponderance over the pedal solely in order to close the butterfly valve when the lever is actuated. The primary of the ignition coil may also be mounted in a circuit controlled by the switch which is in turn controlled by the gear-lever, in order that the ignition may be cut-off at the moment of operation of the gears.

In certain circumstances, for example when climbing a very steep slope with a heavily-loaded vehicle it might be feared that any voluntary or automatic release of the accelerator and/or the cutting-off of the ignition at the moment of changing gears, would not be sufficient to disengage the free-wheel and to permit an easy change of gears, since the driven shaft would slow-down more quickly than the driving shaft. As will be understood, this is especially likely to occur when the main coupling is of the hydraulic type and has a parasitic or residual torque.

In order to overcome this drawback, and in accordance with a further special feature of the invention, the intermediate member arranged on the rear side of the main coupling and on the forward side of the auxiliary coupling comprises a braking means on a fixed part, which is made active or inactive, depending on whether the torque-limiter of the auxiliary coupling is free or engaged. Even if the gears are changed as the vehicle is climbing a difficult slope, and even if the main coupling has a residual torque, the intermediate member is powerfully braked and slows-down very much more rapidly than the driven shaft. The free-wheel is thus released and the change of gear is carried out without difficulty. This braking of the intermediate shaft when the gear-lever is actuated removes the residual torque of the main coupling when the vehicle is stationary, and permits of easy engagement of a gear.

The special features and advantages of the invention will further be brought out in the description which follows below of certain forms of construction, chosen by way of example with reference to the attached drawings, in which:

Fig. 1 is a view in longitudinal cross-section of a device in accordance with the invention;

Fig. 2 is a view on a smaller scale of a part of the said device in elevation, in the direction of the arrows II—II of Fig. 1;

Fig. 3 is a diagram which illustrates the operation of the device;

Fig. 4 is a view of a modified detail of the device of Fig. 1, in longitudinal cross-section, taken along the line IV—IV of Fig. 5;

Fig. 5 is a corresponding view of this detail in transverse cross-section following the line V—V of Fig. 4;

Fig. 6 is a view similar to that of Fig. 5, but in which the position of the members is different;

Fig. 7 is a diagram showing the operation of the device, comprising the arrangement of Figs. 4 to 6;

Fig. 8 is a view similar to that of Fig. 1 but relating to an alternative form of the device;

Fig. 9 is a view to a larger scale of a detail of Fig. 8, in elevation, following the arrows IX—IX of this figure;

Fig. 10 is a view in longitudinal cross-section, also to a larger scale, of a further detail of Fig. 8;

Figure 11:
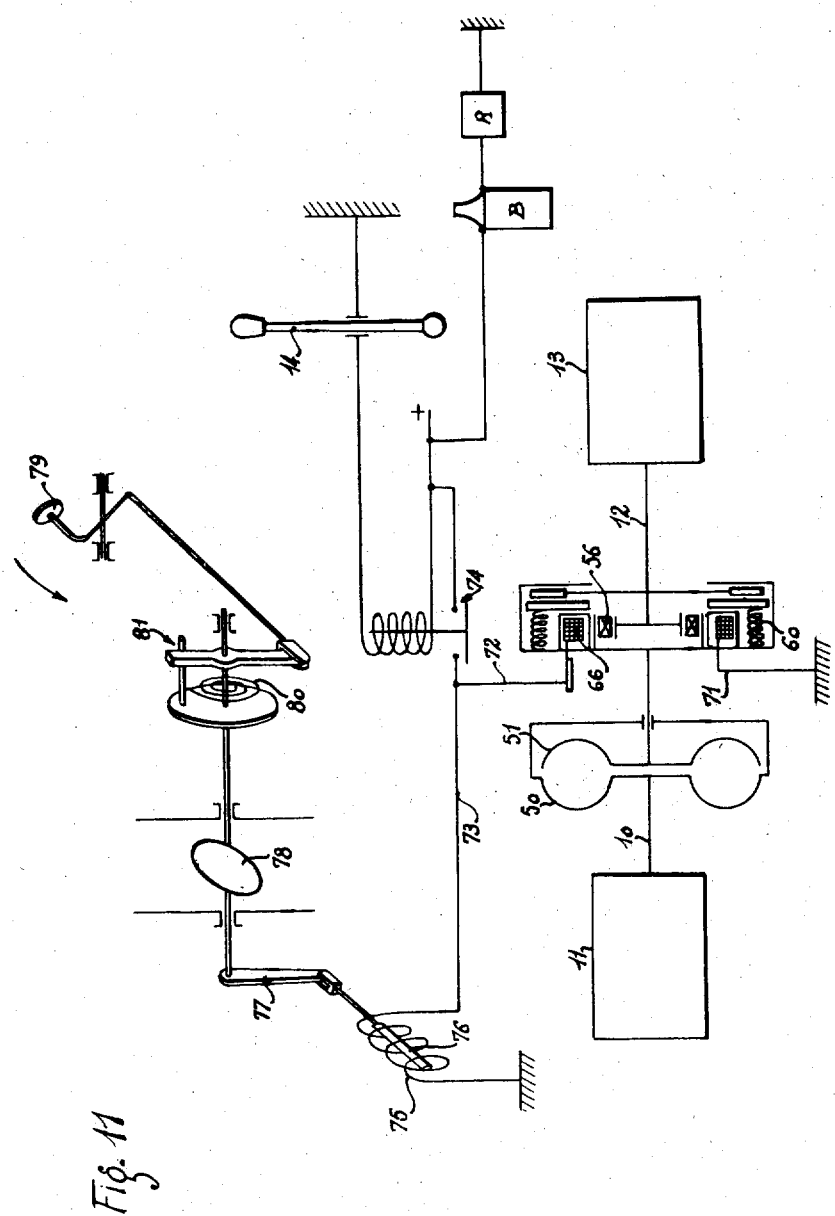
Fig. 11 is a diagram showing the operation of the device of Figs. 8 to 10.

In the form of embodiment shown in Figs. 1 to 3, there can be seen in these figures, at 10 the shaft of the engine 11 of an automobile vehicle, and at 12 the primary shaft of the gear-box 13 with gear-lever 14. This gear-box 13 is preferably of the synchronised type.

The driving shaft 10 is rigidly fixed to a fly-wheel 15 which forms the weight-head carrier of a mechanical centrifugal device 16. This device constitutes a main coupling which is sensitive to the speed of the driving shaft. The weight-heads 17 are pivoted about spindles 18 carried by the fly-wheel 15. Each weight-head 17 is provided with a friction lining 19 and co-operates with an external cylindrical friction track formed inside a drum 20. In addition, a return spring 21 is applied to each weight-head 17 in order to eliminate all parasitic contact at 19, 20, when the speed of the shaft 10 is low. Stop-members or abutments 22 are associated with the springs 21 so as to retain the weight-heads thus returned in suitable positions. The drum 20 is mounted so as to be fixed axially but free for rotation from the fly-wheel 15. It is fixed at 23 to the yoke 24 of an electro-magnet, which is itself mounted on a self-lubricating bearing 25 fixed to the plate 15. This bearing is of small diameter and surrounds the shaft 12 which is kept centered in this zone by a bearing 26. It will be noted that the centrifugal device is thus housed with very small space requirements, between the yoke 24 and the fly-wheel 15, inside the drum 20.

The yoke 24 is rigidly fixed to the external cage 27 of a free-wheel 28, the internal ring 29 of which is fixed to the primary shaft 12. The free-wheel 28 is directed in such a way as to form a rigid coupling between the drum 20 and the shaft 12 when it is the drum 20 which tends to drive the shaft 12, and so as to form no coupling or restraint in the contrary case. With the yoke 24 is associated an armature 30 mounted fast for rotation but free for lateral movement on the yoke by any suitable means, and preferably by means of flexible tangential tongues (not shown).

Two friction plates 31 and 32 are respectively fixed to the yoke 24 and to the armature 30, and are intended to grip between them a friction disc 33 which is mounted fast for rotation on the shaft 12. The plates 31, 32, the friction disc 33 and the electro-magnet 24, 30 form a torque-limiting device connected in parallel with the free-wheel 28 to constitute an auxiliary coupling. The assembly comprised by the plates 31 and 32 is axially spaced apart from the electro-magnet 24, 30, and the external plate 32 carries two collector rings which are connected to the two ends of the coil 34 of the yoke. One of these rings 35 receives a brush 36 connected to ground at 37 (see Fig. 3), while the other ring 38 receives a brush 39 supplied from the battery circuit 40 of the vehicle, through the medium of a relay 41 which cuts off or maintains the supply to the brush 39, depending on whether the gear-lever 14, which operates a switch 42 in the circuit of the relay, is actuated or not. It will be understood that the gear shift lever 14 is of the type used in conjunction with automatic clutches and the electric switch 42 is responsive to the pressure on the lever. Such levers are known in the art and an example of one is disclosed in our copending application No. 411,229 filed February 18, 1954, now Patent No. 2,846,036 dated August 5, 1958. It will be noted that the circuit which comprises the primary of the ignition coil B and the switch R is controlled in dependence on the position of the relay 41.

The electro-magnetic arrangement is chosen in such a way that when the coil 34 is supplied with current, the attraction between the yoke and the armature produces a gripping action on the friction disc 33 by the plates 31 and 32, which permits of a torque slightly greater than the torque developed by the compression of the engine 11, and corresponding roughly to one third of the maximum engine torque.

During operation, when the gear-lever 14 is not changed in position, the coil 34 is supplied with current; the friction disc 33 is gripped and is capable of transmitting a limited torque equal to the braking torque of the engine. If it is the engine which is driving the vehicle, the free-wheel 28 forms a rigid coupling, since the friction-disc 33 is short-circuited, and it is the action alone of the weight-heads 17 of the centrifugal device which governs the action of the driving shaft 10 on the primary shaft 12. During starting and when accelerating, a good progression is obtained, while when the engine has reached a suitable speed, the device rotates as a whole without slip.

If it is the vehicle which tends to drive the engine, for example as a result of a sharp release of the accelerator, the free-wheel is inactive and the friction-disc 33 then takes part in the transmission, in series with the centrifugal device. By virtue of the systematic limitation of the torque transmissible at 31, 33, 32, this enables advantage to be taken of the braking torque of the engine, whilst at the same time preventing the transmission of shocks to the transmission system or the skidding of the driving wheels, dangers which the centrifugal device alone could not prevent in all circumstances.

When the lever 14 is disengaged into neutral in order to change gears, the coil 34 is no longer supplied with current and the friction disc 33 is totally disengaged. At the same time, the circuit of the ignition is broken. The engine thus slows-down very rapidly. In addition, since the driver generally releases the accelerator when changing gears, the shaft 12 tends to rotate more rapidly than the driving shaft, the free-wheel 28 is thus inactive and all coupling is eliminated between the shafts 10 and 12. The movement of the lever 14 into the neutral position thus never meets with any resistance and is carried out with great ease, as is also the engagement of the new gear, since all coupling remains interrupted between the shafts 10 and 12. When changing-up through the gears, the slowing-down of the engine is always sufficient to disengage the free-wheel, in spite of the slowing-down of the shaft 12, due to the engagement of a higher gear. When changing-down through the gears, the shaft 12 accelerates at the moment of engagement of a lower gear, and the free-wheel, which is already inactive, necessarily so remains after this operation.

It might, however, be feared that when climbing a steep slope with a heavily-loaded vehicle, the shaft 12 would have a tendency to slow-down faster than the engine speed would fall when the accelerator is released, the free-wheel being active and engaged and preventing disengagement of the gear. It should be noted however that in these special conditions in which the speed is low, the centrifugal device is not influenced by the drum and it thus has no residual torque. On the contrary, it disengages very promptly by virtue of the springs 21. Thus in any case, the lever can be disengaged from the neutral position. On the other hand, when a lower gear is engaged, at which the shaft 12 rotates more rapidly, such an engagement is readily carried out.

In the form of embodiment shown in Figs. 1 to 3, the coil 34 is constantly energised with current, except during changing gear, although this current is actually only useful when the free-wheel 28 is made inactive. It is in order to avoid this waste of current during the inactive periods that certain means have been provided in the alternative form shown in Figs. 4 to 7.

In accordance with these means, a switch 43 is mounted between the collector ring 38 and the coil 34 (see Fig. 7). The switch 43 comprises a fixed terminal 44 (see Figs. 4 to 6) and a movable finger formed by a lever 45. The latter is pivoted so as to be electrically insulated from the plate 32 and is engaged in a slot 46 of a ring 47 which is fast for rotation with the plate 32, and also in a slot 48 formed in a ring 49. The latter is mounted with a light friction contact around the hub of the friction disc which is fixed for rotation with the primary shaft 12.

When the driving shaft 10 tends to rotate more rapidly than the shaft 12, the lever 45 opens the switch 43 (see Fig. 6). The coil 34 is no longer supplied with current. When the primary shaft 12 tends to rotate more rapidly than the driving shaft 10, the lever 45 closes the switch 43 (see Fig. 5) and the coil 34 is then energised.

Reference will now be made to Figs. 8 to 11 in which a further alternative form of embodiment is shown.

There will again be seen in Fig. 8, the driving shaft at 10, and at 12 the primary shaft of the synchro-mesh gearbox. The centrifugal device which forms the main coupling is in this case not mechanical but hydraulic. It consists, for example, of a coupler the pump 50 of which is rigidly coupled to the shaft 10 and the turbine 51 of which is fixed to a hollow shaft 52. The latter is suitably centered with respect to the shafts 10 and 12, and surrounds the latter shaft 12. It has keyed on to it a bell-shaped member 53 which is fixed at 54 to a plate 55. The plate 55 is fixed to the outer cage of a free-wheel 56, the inner ring of which is fixed to the shaft 12. A friction-disc 57, mounted fast for rotation with the said shaft 12, is intended to be gripped between the plate 55 and a plate 58 which is mounted so as to be axially movable but fixed for rotation on the plate 55 by means of small flexible tangential tongues 59 (see Figs. 8 and 9). The plate 58 is applied against the friction-disc 57 by means of the springs 60. The latter are calibrated in such a way that the gripping action on the friction disc 56 by the plates 55 and 58 permits of the transmission of a torque which is slightly greater than the torque developed by the compression of the engine.

The plate 58 is provided with projecting radial limbs 61 on which are fixed friction pastilles 62 co-operating with a fixed wall 63 of the casing. The pastilles 62 are moved away from the wall 63 when the friction disc 57 is gripped between the plates 55 and 58, and are applied against the wall 63 when the friction disc 57 is disengaged. The disengagement of the friction disc 57 is carried out by means of an electro-magnet, the yoke 64 of which is rigidly fixed to the bell 53, while the armature 65 is fixed to the plate 58. The electro-magnet 64, 65, the springs 60, the plates 55, 58, and the friction disc 57 form a torque-limiter device which is mounted in parallel with the free-wheel 56 to constitute an auxiliary coupling.

The coil 66 of the yoke 64 has its two ends connected, in the manner shown at 67 (Fig. 10), to two collector rings 69 and 70 carried by the plate 55. The brushes 71 and 72 co-operate with the rings 69 and 70. The brush 71 is connected to ground, while the brush 72 is connected as shown in Fig. 11, to the battery circuit 73 of the vehicle. The circuit 73 comprises a relay 74 similar to the relay 41 but operating in the reverse direction. The relay 74 maintains or cuts-off the current supply of the brush 72, depending on whether the gear-lever 14 is actuated or not. It will be noted from Fig. 11 that the circuit of the ignition coil B is not affected by the functioning the clutch.

The circuit 73 also comprises a solenoid 75, the moving armature 76 of which is connected through a rod and crank system 77 to the butterfly valve 78 of the carburetor. The control of this valve 78 from the pedal of the accelerator 79 is specially arranged. A spring 80 tends to open the butterfly valve 78, the opening of this valve by the action of the spring being controlled by the pedal 79 by means of a rigid one-way driving device 81, in such manner that when the solenoid 75 is not energised, the butterfly valve 78 is closely controlled by means of the pedal 79, whilst when the solenoid 75 is energised, the butterfly valve 78 is closed against the action of the spring 80, whatever the position of the pedal 79 may be.

The operation of this arrangement is similar to that which has been previously described, except that the consumption of current is limited to the moments when changing gear. It is to be noted that the residual torque developed by the coupler 50, 51, and which may interfere with the engagement of the gears when stationary and in certain difficult circumstances, is counteracted in its effects by the braking action at 62, 63 which causes an increased and immediate slowing-down of the shaft 52. Any type of known and/or appropriate device could also be provided, which are adapted to eliminate the effects of residual torque, for example, as known per se, by an arrangement for partly or wholly emptying the coupler when the engine is idling.

It will also be appreciated that by virtue of the arrangement shown in Fig. 11, the user is freed from the necessity of releasing the accelerator when changing gear.

It will, of course, be understood that the invention is not limited to the forms of construction described and shown, but includes all the alternative forms thereof in its scope.

What we claim is:

1. In a power transmission system for vehicle having an engine, a driving shaft rotatively driven by the engine, a driven shaft, a change-speed gear box operably connected with the driven shaft, a shift lever for actuating said gear box and movable between a number of positions for changing gear ratios, an automatic clutch arrangement comprising, speed-responsive centrifugally operated first coupling means capable of transmitting a transmissible torque which varies as a function of the speed of the driving shaft, said first coupling means comprising a primary element connected to said driving shaft so as to be rotatively driven by it, a rotatable secondary element rotatively driven in dependence upon rotation of the primary element, said first coupling means including means to couple the primary and secondary elements in dependence upon the speed of rotation of said primary element, a second coupling means comprising a one-way device for operatively connecting the secondary element with said driven shaft in its forward direction of rotation, a torque-limiting device selectively engageable for operatively connecting said secondary element and said driven shaft and arranged to operate in parallel with said one-way device to transmit a selected transmissible torque which has a value well below the maximum torque of the engine, and means responsive to the movement of the shift lever for engaging the torque-limiting device when the shift lever is released by the driver subsequent to operating it and for disengaging said torque-limiting device when the shift lever is operated by the driver for changing gear ratios.

2. A power transmission system according to claim 1, in which said first coupling means comprises an automatic centrifugal mechanical clutch.

3. A power transmission system according to claim 1, in which said first coupling means comprises a fluid-coupling.

4. A power transmission system according to claim 1, in which said one-way device comprises a free-wheel device.

5. In a power transmission system for a vehicle having an engine, a driving shaft rotatively driven by the engine, a driven shaft, a change-speed gear box operably connected to the driven shaft, a shift lever for actuating said gear box and movable between a number of positions for changing gear ratios, an automatic clutch arrangement comprising, speed-responsive centrifugally operated first coupling means capable of transmitting a transmissible torque which varies as a function of the speed of the driving shaft, said first coupling means comprising a primary element connected to said driving shaft so as to be rotatively driven by it, a rotatable secondary element rotatively driven in dependence upon rotation of the primary element, said first coupling means including means to couple the primary and secondary elements in dependence upon the speed of rotation of said primary element, a second coupling means comprising a one-way device for operatively connecting the secondary element with said driven shaft in its forward direction of rotation, a torque-limiting device selectively engageable for operatively connecting said secondary element and said driven shaft and arranged to operate in parallel with said one-way device and to transmit a selected transmissible torque which has a value well below the maximum torque of the engine, said torque-limiting device comprising a pair of plates connected to the secondary element and rotatively driven thereby, a friction disc selectively grasped between said plates and connected to the driven shaft for selectively frictionally connecting the secondary element and the driven shaft and cooperating with said plates in determining said value of transmissible torque, and control means responsive to the movement of the shift lever for engaging the torque-limiting device when the shift lever is released by the driver subsequent to operating it and for disengaging said torque-limiting device when the shift lever is operated by the driver for changing gears.

6. A power transmission system according to claim 5, in which said torque-limiting means comprises an operating coil and in which said control means comprises circuit means for energizing said operating coil and a first switch in said circuit operative to close the circuit when the shift lever is released by the driver subsequent to operating it and operative to open the circuit when the shift lever is operated by the driver for changing gears.

7. A power transmission system according to claim 5, in which said torque-limiting means comprises electro-magnetic means for frictionally engaging the plates and the disc, and in which said control means comprises circuit means for energizing said electro-magnetic means, a first switch in said circuit operative to close the circuit when the shift lever is released by the vehicle driver subsequent to operating it and operative to open the circuit when the shift lever is operated by the driver for changing gears, and a second switch in said circuit responsive to a condition wherein said driving shaft over-runs the driven shaft to open the circuit when said condition obtains.

8. A power transmission system according to claim 5, including means for braking said second element in response to the disengagement of the torque-limiting means.

9. In a power transmission system for a vehicle having an engine provided with an air-fuel mixture intake, a butterfly valve in the air-fuel mixture intake of said engine, an accelerator for opening and closing the butterfly valve, means constantly biasing the butterfly valve toward an open position, means operatively associated with the accelerator for controlling said biasing means to limit the opening of said valve with the accelerator, a driving shaft rotatively driven by the engine, a driven shaft, a change-speed gear box operably connected to the driven shaft, a shift lever for actuating said gear box and being movable between a number of positions for changing gear ratios, an ignition coil for igniting the air-fuel mixture in the engine, a circuit for energizing the ignition coil, an automatic clutch arrangement comprising speed-responsive centrifugally operated first coupling means capable of transmitting a transmissible torque which varies as a function of the speed of the driving shaft, said first coupling means comprising a primary element connected to said driving shaft so as to be rotatively driven by it, a rotatable secondary element rotatively driven in dependence upon rotation of the primary element, said first coupling means including means to couple the primary and secondary elements in dependence upon the speed of rotation of said primary element, a second coupling means comprising a one-way device for operatively connecting the secondary element with said driven shaft in its forward direction of rotation, a torque-limiting device selectively engageable for operatively connecting said secondary element and said driven shaft and arranged to operate in parallel with said one-way device and to transmit a selected transmissible torque which has a value well below the maximum torque of the engine, and control means responsive to the moving of the shift lever for engaging the torque-limiting device when the shift lever is released by the driver subsequent to operating it and for disengaging said torque-limiting device when the shift lever is operated by the driver for changing gears and including means effective to move the butterfly valve in a direction for closing it in opposition to said biasing means when the shift lever is moved to a position for changing gear ratios.

10. In a power transmission system according to claim 9, in which the means for moving the butterfly valve in opposition to the biasing means comprises, a solenoid operatively connected to the butterfly valve, and electrical connections including a switch means actuated by the shift lever for energizing the solenoid when the shift lever is moved to change gear ratios.

References Cited in the file of this patent

UNITED STATES PATENTS

| | | |
|---|---|---|
| 417,973 | Blackhall et al. | Dec. 24, 1889 |
| 1,186,745 | Callaway | June 13, 1916 |
| 2,093,236 | Dodge et al. | Sept. 14, 1937 |
| 2,447,007 | Gravina et al. | Aug. 17, 1948 |